(12) United States Patent
Hsu et al.

(10) Patent No.: US 9,018,307 B2
(45) Date of Patent: Apr. 28, 2015

(54) ADHESIVE COMPOSITION

(71) Applicant: BenQ Materials Corporation, Taoyuan County (TW)

(72) Inventors: Tsung-Ju Hsu, Taichung (TW); Yu-Chen Yeh, New Taipei (TW); Kai-Hsuan Chang, Chiayi (TW)

(73) Assignee: BenQ Materials Corporation, Taoyuan County (TW)

( * ) Notice: Subject to any disclaimer, the term of this patent is extended or adjusted under 35 U.S.C. 154(b) by 0 days.

(21) Appl. No.: 14/285,654

(22) Filed: May 23, 2014

(65) Prior Publication Data

US 2014/0350185 A1 Nov. 27, 2014

(30) Foreign Application Priority Data

May 24, 2013 (TW) .............................. 102118535 A

(51) Int. Cl.
| | |
|---|---|
| *C08F 8/00* | (2006.01) |
| *C08F 118/02* | (2006.01) |
| *C08F 20/06* | (2006.01) |
| *C08F 20/44* | (2006.01) |
| *C08F 212/06* | (2006.01) |
| *C08F 112/06* | (2006.01) |
| *C09J 171/00* | (2006.01) |

(52) U.S. Cl.
CPC ..................................... *C09J 171/00* (2013.01)

(58) Field of Classification Search
CPC ....................................................... C09J 171/00
USPC ............... 525/152; 526/317.1, 319, 341, 347, 526/347.2
See application file for complete search history.

(56) References Cited

FOREIGN PATENT DOCUMENTS

| | | | |
|---|---|---|---|
| CN | 1970673 | A | 5/2007 |
| CN | 101178948 | A | 5/2008 |
| CN | 101981149 | A | 2/2011 |
| CN | 102533144 | A | 7/2012 |
| CN | 102640277 | A | 8/2012 |
| TW | 538655 | B | 6/2003 |
| TW | 201012890 | | 4/2010 |
| TW | 201012893 | A | 4/2010 |
| TW | 201315787 | A | 4/2013 |
| WO | WO 2012/013330 | A2 * | 2/2012 |

* cited by examiner

*Primary Examiner* — William Cheung
(74) *Attorney, Agent, or Firm* — CKC & Partners Co., Ltd.

(57) ABSTRACT

The invention provides an adhesive composition for conduction between electrical elements, comprising 25 to 46 parts by weight of nitrile-butadiene rubber with Mooney viscosity ranged from 50 to 75 (ML 1+4@100)° C., 25 to 45 parts by weight of acrylic oligomer, 16 to 32 parts by weight of thermoplastic resin, two organic peroxides having different one-minute half-life temperatures from each other, and a coupling agent. The thermoplastic resin is selected from the group consisting of phenoxy resin, poly(methyl)methacrylate copolymer, polystyrene copolymer and Novolak resin.

11 Claims, No Drawings

ADHESIVE COMPOSITION

RELATED APPLICATIONS

This application claims priority to Taiwan Application Serial Number 102118535, filed May 24, 2013, which is herein incorporated by reference.

BACKGROUND

1. Technical Field

The present invention relates to an adhesive composition. More particularly, the adhesive composition is used for bonding electrical elements.

2. Description of Related Art

Recently, with the increase in integration density of IC chips, the space between bumps of an IC chip is being narrowed to a finer pitch. The bump surface areas are also being reduced. In this regard, an anisotropic conductive film is more likely suffering from a conducting problem in the longitudinal direction (z-direction) in that the narrower bump surface areas become more difficult to trap conductive particles in the anisotropic conductive film. Moreover, the finer pitch between bumps increases the short-circuit probability of an electric element because the conductive particles in the anisotropic conductive film also facilitate the conduction in the transverse direction (x- or y-direction).

Taiwanese patent publication No. 201012890 discloses an acrylic insulating adhesive used for bonding electric elements, e.g. the bumps of IC chip to connection pads of a circuit board. However, there is still a need to develop a novel adhesive composition to address the disadvantages of the anisotropic conductive film mentioned above.

SUMMARY

According to aforementioned reasons, the present invention provides a novel adhesive composition which is related to insulating polymers. In embodiments of the present invention, after curing, the present adhesive composition generates the cohesive force to maintain the bonding between two electrical elements and the conduction therebetween. The adhesive composition of the present invention also provides good peeling force and excellent storage stability. Furthermore, the present adhesive composition includes rubber components so as to provide flexibility thereto and thus can be applied on the flexible electric components and circuits.

According to an aspect of the present invention, the adhesive composition for bonding electrical elements comprises: 25 to 46 parts by weight of a nitrile-butadiene rubber with Monney viscosity in the range of 50 to 75 (ML1+4@100); 25 to 45 parts by weight of an acrylate oligomer; 16 to 32 parts by weight of a thermoplastic resin; two organic peroxides with different one minute half-life from each other and a coupling agent. The thermoplastic resin is selected from the group consisting of phenoxy resin, phenolic resin, (methyl)methacrylate polymer, polystyrene and a combination thereof.

The Monney viscosity measurement is determined by ASTM D-1646.

According to an aspect of the present invention, the weight average molecular weight of the nitrile-butadiene rubber is in the range of 200,000 to 600,000.

According to an aspect of the present invention, the acrylate oligomer is selected from the group consisting of epoxy acrylate oligomer, polyurethane acrylate oligomer, polyester acrylate oligomer and a combination thereof.

According to an aspect of the present invention, of the two organic peroxides, one organic peroxide has a higher one minute half-life temperature in the range of 130° C. to 140° C., and the other organic peroxide has a lower one minute half-life temperature in the range of 110° C. to 120° C.

According to an aspect of the present invention, of the two organic peroxides, one organic peroxide has a higher one minute half-life temperature is benzoyl peroxide or bis(4-methylbenzoyl)peroxide, and the other organic peroxide has a lower one minute half-life temperature is lauroyl peroxide or bis(2,4-dichlorobenzoyl)peroxide.

According to an aspect of the present invention, the organic peroxides is present at an amount of 0.5 to 5.0 parts by weight based on the total weight of the nitrile-butadiene rubber, the acrylate oligomer and the thermoplastic resin as 100 parts by weight.

According to an aspect of the present invention, the coupling agent is selected from the group consisting of 2-(acryloyloxy)ethyl acid phosphate, triacetoxyvinylsilane, (3-epoxy propoxy propyl)trimethoxysilane, 3-(trimethoxysilyl)propyl isocyanate and a combination thereof.

According to an aspect of the present invention, the coupling agent is present at an amount of 0.5 to 2.0 parts by weight based on the total weight of the nitrile-butadiene rubber, the acrylate oligomer and the thermoplastic resin as 100 parts by weight.

According to an aspect of the present invention, the adhesive composition further includes a reaction promoter, a crosslinking agent or a combination thereof.

According to an aspect of the present invention, the reaction promoter is selected from the group consisting of N,N-dimethyl aniline, N,N-diethyl aniline, N,N-dimethyl-p-toluidine and a combination thereof. The reaction promoter is present at an amount of 0.5 to 2.0 parts by weight based on the total weight of the nitrile-butadiene rubber, the acrylate oligomer and the thermoplastic resin as 100 parts by weight.

According to an aspect of the present invention, the crosslinking agent is an oligomer containing at least three unsaturated double bonds, which is selected from the group consisting of tris(2-hydroxy ethyl)isocyanaurate triacrylate, trimethylolpropane triacrylate, pentaerythritol triacrylate and a combination thereof. The crosslinking agent is present at an amount of 1 to 4 parts by weight based on the total weight of the nitrile-butadiene rubber, the acrylate oligomer and the thermoplastic resin as 100 parts by weight.

The above and other aspects of the invention will become better understood with regard to the following detailed description of the preferred but non-limiting embodiment(s).

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

The present invention provides a novel adhesive composition which would generates the cohesive force to maintain the bonding between the two electrical elements and the conduction therebetween after curing. The adhesive composition of the present invention also provides good peeling force and excellent storage stability. Furthermore, the adhesive composition includes rubber components so as to provide flexibility thereto and thus can be applied on the flexible electric components and circuits.

The adhesive composition of the present invention, comprises: 25 to 46 parts by weight of a nitrile-butadiene rubber with Monney viscosity in the range of 50 to 75 (ML1+4@100); 25 to 45 parts by weight of an acrylate oligomer; 16 to 32 parts by weight of a thermoplastic resin; two organic peroxides with different one minute half-life from each other and a coupling agent. The thermoplastic resin is selected from the group consisting of phenoxy resin, phenolic resin, (methyl)methacrylate polymer, polystyrene and a combination thereof.

If the content of the nitrile-butadiene rubber in the adhesive composition is less than 25 parts by weight, the film-forming ability of the adhesive composition is insufficient. If the content of the nitrile-butadiene rubber in the adhesive composition is more than 46 parts by weight, the dimension stability thereof will be insufficient after the adhesive composition was cured.

Therefore, in an embodiment of the present invention, the nitrile-butadiene rubber is present at an amount of 25 to 46 parts by weight while the acrylate oligomer is present at an amount of 25 to 45 parts by weight and the thermoplastic resin is present at an amount of 16 to 32 parts by weight. In a preferred embodiment of the present invention, the nitrile-butadiene rubber is present at an amount of 35 to 43 parts by weight.

Moreover, if the Monney viscosity of the nitrile-butadiene rubber used in the present adhesive composition is too high or the weight average molecular weight thereof is too large, the flow ability of the adhesive composition will be too low to result in loose bonding between two electric elements and reduce the conduction therebetween. If the Monney viscosity of the nitrile-butadiene used in the present adhesive composition is too low or the molecular weight thereof is too small, the flow ability of the adhesive composition will be too high to overflow, so as to deteriorate the adhesion between electrical elements.

Accordingly, the weight average molecular weight of the nitrile-butadiene rubber used in the present adhesive composition is in the range of 200,000 to 600,000, preferably in the range of 300,000 to 450,000. In an embodiment of the present invention, the Monney viscosity of the nitrile-butadiene used in the present adhesive composition is in the range of 50 to 75 (ML1+4@100). In another embodiment of the present invention, the Monney viscosity of the nitrile-butadiene used in the present adhesive composition is in the range of 60 to 75 (ML1+4@100) and the weight average molecular weight thereof is about 330,000.

Furthermore, the adhesive composition of the present invention is able to be cured at low temperature because the acrylic oligomer component is present. As a result, the adhesive composition of the present invention can be used in low temperature bonding process, such as COG (Chip on Glass) TAB (Tape Automated Bonding) and COF (Chip on Film) applications.

The acrylate oligomer suitable used in the present adhesive composition is the acrylate oligomer commonly used in the related art and is known to the person skilled in the art. The suitable acrylate oligomer, can be but not limited to, such as, for example epoxy acrylate oligomer, polyurethane acrylate oligomer, polyester acrylate oligomer and a combination thereof. In an embodiment of the present invention, the acrylate oligomer is epoxy acrylate oligomer.

If the content of the acrylate oligomer of the present adhesive composition is less than 25 parts by weight, the dimension stability thereof will be insufficient. If the content of the acrylate oligomer of the adhesive composition is more than 45 parts by weight, the peeling force thereof is too small after the adhesive composition was cured.

Thus, in an embodiment of the present invention, the acrylate oligomer is present at an amount of 25 to 45 parts by weight, while the nitrile-butadiene rubber is present at an amount of 25 to 46 parts by weight and the thermoplastic resin is present at an amount of 16 to 32 parts by weight. In another preferred embodiment of the present invention, the acrylate oligomer is present at an amount of 34 to 41 parts by weight while the nitrile-butadiene rubber is present at an amount of 25 to 46 parts by weight and the thermoplastic resin is present at an amount of 16 to 32 parts by weight.

The thermoplastic resin of the present adhesive composition is used for enhancing the adhesion. If the content of the thermoplastic resin of the adhesive composition is less than 16 parts by weight, the adhesion is insufficient. If the content of the thermoplastic resin of the adhesive composition is more than 32 parts by weight, the film-forming ability thereof is too poor to influence the bonding and conducting performance between the two electric elements after the main-bonding process.

Thus, in an embodiment of the present invention, the thermoplastic resin is present at an amount of 16 to 32 parts by weight, while the nitrile-butadiene rubber is present at an amount of 25 to 46 parts by weight and the acrylate oligomer is present at an amount of 25 to 45 parts by weight. In another preferred embodiment of the present invention, the thermoplastic resin is present at an amount of 18 to 26 parts by weight, while the nitrile-butadiene rubber is present at an amount of 25 to 46 parts by weight and the acrylate oligomer is present at an amount of 25 to 45 parts by weight.

Two organic peroxides of the adhesive composition of the present invention have different one minute half-life from each other. One of the organic peroxides has a higher one minute half-life temperature and the other one organic peroxide has a lower one minute half-life temperature. These peroxides are used as initiators for radical polymerization.

If only the organic peroxide having a lower one minute half-life temperature is used, the polymerization rate becomes too fast so as to generate high internal stress in the adhesive composition and larger crosslinking density thereof. For the reasons given above, a small part of adhesive components will be blocked and be difficult to react to each other. Then, the dimension change of the adhesive composition after curing becomes unpredicted.

As a result, two organic peroxides system of the present invention is provided. When the organic peroxide having a higher one minute half-life temperature is used together with the organic peroxide having a lower one minute half-life temperature, the polymerization reaction time can be extended. In this way, the adhesive components can react to each other more completely and the dimension stability of the adhesive composition after curing is preferred.

The organic peroxide aforementioned having a higher one minute half-life temperature is in the range of 130° C. to 140° C., such as benzoyl peroxide (one minute half-life temperature is 132° C.) or bis(4-methylbenzoyl)peroxide (one minute half-life temperature is 130° C.), and the other organic peroxide having a lower one minute half-life temperature is in the range of 110° C. to 120° C., such as lauroyl peroxide (one minute half-life temperature is 117° C.) or bis(2,4-dichlorobenzoyl)peroxide (one minute half-life temperature is 112° C.).

In an embodiment of the present invention, the organic peroxide aforementioned having a higher one minute half-life temperature is benzoyl peroxide and the organic peroxide aforementioned having a lower one minute half-life temperature is lauroyl peroxide.

In an embodiment of the present invention, the organic peroxides is present at an amount of 0.5 to 5.0 parts by weight based on the total weight of the nitrile-butadiene rubber, the acrylate oligomer and the thermoplastic resin as 100 parts by weight.

The coupling agent of the adhesive composition of the present invention is used to enhance adhesion of the present adhesive composition. The coupling agent aforementioned is known to the person skilled in the art. The suitable coupling agent, can be but not limited to, such as, for example is selected from the group consisting of 2-(acryloyloxy)ethyl acid phosphate, triacetoxyvinylsilane, (3-epoxy propoxy propyl)trimethoxysilane, 3-(trimethoxysilyl)propyl isocyanate and a combination thereof. In an embodiment of the present invention, the coupling agent is present at an amount of 0.5 to 2.0 parts by weight based on the total weight of the nitrile-butadiene rubber, the acrylate oligomer and the thermoplastic resin as 100 parts by weight.

In an embodiment of the present invention, the coupling agent is 2-(acryloyloxy)ethyl acid phosphate for enhancing the resistance ability of the present adhesive composition in high temperature and high humidity condition test.

In addition to the components of the adhesive composition mentioned above, the adhesive composition further includes a reaction promoter, a crosslinking agent or a combination thereof.

The reaction promoter aforementioned is selected from the group consisting of N,N-dimethyl aniline, N,N-diethyl aniline, N,N-dimethyl-p-toluidine and a combination thereof, wherein the reaction promoter is present at an amount of 0.5 to 2.0 parts by weight based on the total weight of the nitrile-butadiene rubber, the acrylate oligomer and the thermoplastic resin as 100 parts by weight.

In the embodiment of the invention, the crosslinking agent is an oligomer containing at least three unsaturated double bond in the structure. The crosslinking agent of the present adhesive composition is selected from the group consisting of tris(2-hydroxy ethyl)isocyanaurate triacrylate, trimethylolpropane triacrylate, pentaerythritol triacrylate and a combination thereof. The crosslinking agent is present at an amount of 1 to 4 parts by weight based on the total weight of the nitrile-butadiene rubber, the acrylate oligomer and the thermoplastic resin as 100 parts by weight.

In an embodiment of the present invention, the reaction promoter is N,N-dimethyl aniline and the crosslinking agent is tris(2-hydroxy ethyl)isocyanaurate triacrylate.

The present invention will be explained in further detail with reference to the examples. However, the present invention is not limited to these examples.

The Preparation Method of an Adhesive Composition

Example 1

20 g of nitrile-butadiene rubber (trade name is NBR 1051 the weight average molecular weight is 330,000, the Monney viscosity is in the range of 60 to 75 (ML1+4@100), available from NANTEX industry Co. Ltd.) was dissolved in 80 g methyl ethyl ketone to form a first reaction solution with solid content about 20% (w/w). Then, 37 g of thermoplastic resin (trade name is PKHH, the weight average molecular weight is 52,000, available from InChem Corp.) was dissolved in 63 g methyl ethyl ketone to form a second reaction solution with solid content about 37% (w/w).

In the first step, 13 g of the first reaction solution, 4.39 g of the second reaction solution, 2.275 g of acrylate oligomer (trade name is 3002A which is an epoxy acrylate oligomer, available from IKYOEISHA CHEMICAL CO., LTD.), 0.07 g of 2-(acryloyloxy)ethyl acid phosphate (trade name is P-A (N), available from IKYOEISHA CHEMICAL CO., LTD.) and 3.5 g of methyl ethyl ketone as solvent were mixed and be stirred at high speed for 300 seconds at room temperature.

In the second step, 0.035 g of dibenzoyl peroxide (BPO) and 0.07 g of dilauroyl peroxide (LPO) were added in to the reaction solution prepared in the first step and be stirred at high speed for 300 seconds at room temperature. Then, the adhesive composition 1 was obtained.

Example 2

The preparation method of Example 2 is the same as Example 1, except that the amount of the nitrile-butadiene, the thermoplastic resin, the acrylate oligomer and solvent. The detailed compositions of Example 2 are listed in Table 1 below.

Example 3

The preparation method of Example 3 is the same as Example 2, except that the amount of the thermoplastic resin and solvent. The detailed compositions of Example 3 are listed in Table 1 below.

Example 4

The preparation method of Example 4 is the same as Example 3, except that the amount of the thermoplastic resin, the acrylic oligomer and solvent. The detailed compositions of Example 4 are listed in Table 1 below.

Example 5

The preparation method of Example 5 is the same as Example 4, except that the amount of the thermoplastic resin and solvent. The detailed compositions of Example 5 are listed in Table 1 below.

Example 6

The preparation method of Example 6 is the same as Example 1, except that the addition of dimethyl aniline as a reaction promoter in the first step in Example 6

Example 7

The preparation method of Example 7 is the same as example 6, except that the addition of tris(2-hydroxy ethyl) isocyanaurate triacrylate as a crosslinking agent in the first step in Example 7 and the amount of the nitrile-butadiene rubber and the acrylate oligomer.

The Preparation Method of an Adhesive Film

The adhesive composition prepared from Example 1 to Example 7 was coated on a release film and dried in the oven at 80° C. for 5 minutes to prepare a 35 um thick adhesive film.

Production of an Electrical Connection Structure

Firstly, The adhesive film prepared from Example 1 to Example 7 was pre-bonded to a printed circuit board to form a composite structure (PCB test kit available from Taiwan PCB Techvest Co., Ltd., bump size: 3.4 mm*130 um, bump pitch: 250 um, bump height: 40 um, bump number: 91). The pre-bonding condition is 200° C. for 5 seconds.

Then, the release film was peeled from the adhesive film of the composite structure and a flexible circuit board (BMC-1010419, available from Taiwan Simpal Electronics Co., Ltd., wire weight: 120 um, wire pitch: 250 um, wire height: 8 um) was positioned corresponding to the printed circuit board of the composite structure.

After precise positioning, the flexible circuit board and the composite structure are laminated by main-bonded process in the condition of 175° C. for 5 seconds. Thus, the electrical connection structure was obtained.

Measurement the Conductivity of an Electrical Connection Structure

The connection resistance of an electrical connection structure was measured by a four probe method and the insulation resistance of that was measured by two probe method. The measurement is for the initial connection resistance, the initial insulation resistance of an electrical connection structure, and the connection resistance, the insulation resistance of an electrical connection structure after leaving for an 85° C., 85% RH environment for 500 hours. The obtained results are shown in Table 2.

It can be seen from Table 2 that the initial connection resistance of Example 1 to Example 7 are in the range of 0.044Ω to 0.088Ω. After a high temperature and high humidity test of 85° C. 85% RH for 500 hours, the connection resistance of Example 1 to Example 7 are all smaller than 0.2Ω.

The initial insulation resistance of Example 1 to Example 7 are in the range of $5.12*10^9 \Omega$ to $1.28*10^{10} \Omega$. After a high temperature and high humidity test of 85° C., 85% RH for 500 hours, the insulation resistance of Example 1 to Example 7 are in the range of $9.98*10^9 \Omega$ to $2.09*10^{10} \Omega$.

Peeling Test of an Electrical Connection Structure

The peeling force of an electrical connection structure was measured and evaluated by a 90 degree peeling method. The measurement device used to measure peeling force is COMETECH QC-50881 and peeling speed is 50 mm/min. The measurement is for initial peeling force and the peeling force of the electrical connection structure after leaving for an 85° C., 85% RH environment for 500 hours. The obtained results are shown in Table 2.

It can be seen from Table 2 that, the initial peeling forces of Example 1 to Example 7 are in the range of 1.54 Kgf/in to 2.45 Kgf/in. After a high temperature and high humidity test of 85° C., 85% RH for 500 hours, the peeling force of Example 1 to Example 7 are in the range of 1.97 Kgf/in to 3.48 Kgf/in. As a result, the adhesive film of the present invention exhibits good durability.

Storage Stability Test of an Adhesive Film

The adhesive film must possess excellent storage stability because it may not be used immediately after preparing. The measurement is for the peeling force of the electrical connection structure after leaving for an 40° C., 72 hours. It can be seen from Table 2 that, the peeling forces after the storage stability test of Example 1 to Example 7 are in the range of 1.74 Kgf/in to 2.54 Kgf/in, which are not obviously changed when compared with the initial peeling force. Thus, the adhesive film of the present invention possesses excellent storage stability.

From the measured data in Table 2, it can be seen that the adhesive composition of the present invention provides lower connection resistance, higher insulation resistance, good peeling force and excellent durability and storage stability. Moreover, the adhesive composition possesses flexibility because of the rubber component therein and could be applied on the flexible electric components and circuits.

While the invention has been described by way of example(s) and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

TABLE 1

The detailed components of Example 1 to Example 7

| Component | Trade name | Examples (parts) | | | | | | |
|---|---|---|---|---|---|---|---|---|
| | | 1 | 2 | 3 | 4 | 5 | 6 | 7 |
| Nitrile-butadiene rubber | NBR1051 | 2.600 | 2.925 | 2.925 | 2.925 | 2.925 | 2.600 | 2.275 |
| Thermoplastic resin | PKHH | 1.625 | 1.300 | 1.925 | 1.300 | 1.925 | 1.625 | 1.625 |
| Acrylic oligomer | 3002A | 2.275 | 2.925 | 2.925 | 2.600 | 2.600 | 2.275 | 2.60 |
| Organic peroxides | LPO | 0.070 | 0.070 | 0.070 | 0.070 | 0.070 | 0.070 | 0.070 |
| | BPO | 0.035 | 0.035 | 0.035 | 0.035 | 0.035 | 0.035 | 0.035 |
| Coupling agent | P-A(N) | 0.070 | 0.070 | 0.070 | 0.070 | 0.070 | 0.070 | 0.070 |
| Reaction promoter | DMA | — | — | — | — | — | 0.038 | 0.038 |
| Crosslinking agent | THEICTA | — | — | — | — | — | — | 0.163 |
| Solvent | MEK | 16.5 | 17.4 | 18.5 | 17.4 | 18.5 | 16.5 | 15.2 |

TABLE 2

The measured data of Example 1 to Example 7

| | Connection resistance ($\Omega$) | | Insulation resistance ($\Omega$) | | Peeling force (kgf/in) | | |
|---|---|---|---|---|---|---|---|
| | Original | After 85° C./85%, 500 hrs | Original | After 85° C./85%, 500 hrs | Original | After 85° C./85%, 500 hrs | After 40° C. 72 hrs |
| Example 1 | 0.065 | 0.085 | $8.51 \times 10^9$ | $9.98 \times 10^9$ | 1.54 | 2.20 | 1.95 |
| Example 2 | 0.065 | 0.088 | $7.29 \times 10^9$ | $2.09 \times 10^{10}$ | 1.64 | 2.27 | 2.11 |
| Example 3 | 0.063 | 0.095 | $9.2 \times 10^9$ | $2.06 \times 10^{10}$ | 2.14 | 3.48 | 1.92 |
| Example 4 | 0.044 | 0.090 | $7.04 \times 10^9$ | $1.33 \times 10^{10}$ | 1.98 | 2.61 | 2.02 |
| Example 5 | 0.048 | 0.145 | $1.28 \times 10^{10}$ | $1.58 \times 10^{10}$ | 2.45 | 3.24 | 2.54 |
| Example 6 | 0.088 | 0.174 | $5.12 \times 10^9$ | $1.09 \times 10^{10}$ | 2.29 | 2.35 | 1.98 |
| Example 7 | 0.084 | 0.096 | $9.50 \times 10^9$ | $1.61 \times 10^{10}$ | 1.76 | 1.97 | 1.74 |

What is claimed is:

1. An adhesive composition for conduction between electrical elements, comprising:
    25 to 46 parts by weight of a nitrile-butadiene rubber with Monney viscosity in the range of 50 to 75 (ML1+4@100);
    25 to 45 parts by weight of an acrylate oligomer;
    16 to 32 parts by weight of a thermoplastic resin, selected from the group consisting of phenoxy resin, phenolic resin, (methyl)methacrylate polymer, polystyrene and a combination thereof;
    two organic peroxides with different one minute half-life temperature from each other; and
    a coupling agent.

2. The adhesive composition according to claim 1, wherein the average molecular weight of the nitrile-butadiene rubber is in the range of 200,000 to 600,000.

3. The adhesive composition according to claim 1, wherein the acrylate oligomer is selected from the group consisting of epoxy acrylate oligomer, polyurethane acrylate oligomer, polyester acrylate oligomer and a combination thereof.

4. The adhesive composition according to claim 1, wherein one of the organic peroxides has a higher one minute half-life temperature in the range of 130° C. to 140° C. and another of the organic peroxides has a lower one minute half-life temperature in the range of 110° C. to 120° C.

5. The adhesive composition according to claim 4, wherein the organic peroxide having the higher one minute half-life temperature is benzoyl peroxide or bis(4-methylbenzoyl)peroxide, and the organic peroxide having the lower one minute half-life temperature is lauryl peroxide or bis(2,4-dichlorobenzoyl)peroxide.

6. The adhesive composition according to claim 1, wherein the organic peroxides is present at an amount of 0.5 to 5.0 parts by weight based on the total weight of the nitrile-butadiene rubber, the acrylate oligomer and the thermoplastic resin as 100 parts by weight.

7. The adhesive composition according to claim 1, wherein the coupling agent is selected from the group consisting of 2-(acryloyloxy)ethyl acid phosphate, triacetoxyvinylsilane, (3-epoxy propoxy propyl)trimethoxysilane, 3-(trimethoxysilyl)propyl isocyanate and a combination thereof.

8. The adhesive composition according to claim 1 wherein the coupling agent is present at an amount of 0.5 to 2.0 parts by weight based on the total weight of the nitrile-butadiene rubber, the acrylate oligomer and the thermoplastic resin as 100 parts by weight.

9. The adhesive composition according to claim 1, further comprising a reaction promoter, a crosslinking agent or a combination thereof.

10. The adhesive composition according to claim 1, wherein the reaction promoter is selected from the group consisting of N,N-dimethyl aniline, N,N-diethyl aniline, N,N-dimethyl-p-toluidine and a combination thereof, wherein the reaction promoter is present at an amount of 0.5 to 2.0 parts by weight based on the total weight of the nitrile-butadiene rubber, the acrylate oligomer and the thermoplastic resin as 100 parts by weight.

11. The adhesive composition according to claim 1, wherein the crosslinking agent is an oligomer having at least three unsaturated double bond, and is selected from the group consisting of tris(2-hydroxy ethyl)isocyanaurate triacrylate, trimethylolpropane triacrylate, pentaerythritol triacrylate and a combination thereof, wherein the crosslinking agent is present at an amount of 1 to 4 parts by weight based on the total weight of the nitrile-butadiene rubber, the acrylate oligomer and the thermoplastic resin as 100 parts by weight.

* * * * *